United States Patent [19]
Umbarger et al.

[11] 3,988,615
[45] Oct. 26, 1976

[54] METHOD FOR RADIOACTIVITY MONITORING

[75] Inventors: C. John Umbarger, Los Alamos; Leo R. Cowder, Santa Fe, both of N. Mex.

[73] Assignee: The United States of America as represented by the United States Energy Research and Development Administration, Washington, D.C.

[22] Filed: Apr. 28, 1975

[21] Appl. No.: 572,042

[52] U.S. Cl. ............................ 250/253; 250/363 R
[51] Int. Cl.² ....................... G01T 1/20; G01V 5/00
[58] Field of Search.................... 250/252, 253, 363

[56] References Cited
UNITED STATES PATENTS 2,735,946 2/1956 Stratford et al.................... 250/253
2,897,368 7/1959 Lundberg........................... 250/253

Primary Examiner—Harold A. Dixon
Attorney, Agent, or Firm—Dean E. Carlson; Robert W. Weig

[57] ABSTRACT

The disclosure relates to a method for analyzing uranium and/or thorium contents of liquid effluents preferably utilizing a sample containing counting chamber. Basically, 185.7-keV gamma rays following $^{235}$U alpha decay to $^{231}$Th which indicate $^{235}$U content and a 63-keV gamma ray doublet found in the nucleus of $^{234}$Pa, a granddaughter of $^{238}$U, are monitored and the ratio thereof taken to derive uranium content and isotopic enrichment $^{235}$U/$^{235}$U + $^{238}$U) in the liquid effluent. Thorium content is determined by monitoring the intensity of 238-keV gamma rays from the nucleus of $^{212}$Bi in the decay chain of $^{232}$Th.

3 Claims, 7 Drawing Figures

METHOD FOR RADIOACTIVITY MONITORING

FIELD OF THE INVENTION

The invention relates to radioactivity monitoring and in particular to monitoring for uranium and thorium content in liquid effluents.

BACKGROUND OF THE INVENTION

Recently, there has been increased awareness and concern for environmental protection from radioactive contaminants produced by humans. There is a need for appropriate monitoring devices that are capable of monitoring selected contaminants, which have detectable limits below typical prior art monitoring levels. Such devices and their methods of operation should be simple and low in cost. The methods of the invention are directed to uranium enrichment measurement in liquids and 10 nanocuries per gram (nCi/g) assay for bulk solid transuranic wastes, a monitoring level not achieved by prior art devices.

According to the recently released AEC Manual Chapter 0511 (Radioactive Waste Management), transuranium contaminated solid wastes are "those contaminated with certan alpha-emitting radionuclides of long halflife and high specific radiotoxicity to greater than 10 nanocuries/gram . . . ". The radionuclides included are plutonium and transplutonium nuclides except $^{238}$Pu, and $^{233}$U and its daughter products. The 10-nCi/g level is a criterion for choosing different means of handling different activity levels of transuranium-contaminated solid wastes. Accordingly, a monitoring scheme is needed for measurements at and below this activity level. But due to the very low natural radiation yields (spontaneous fission neutrons and high-energy gamma rays) at such activity levels a different approach than the more conventional assay systems is needed.

SUMMARY OF THE INVENTION

In accordance with the invention there is provided a method for analyzing the uranium content of a liquid effluent sample disposed in a sample counting chamber. The method comprises monitoring the intensity of the 185.7-keV gamma ray emitted immediately following $^{235}$U alpha decay to $^{231}$Th to obtain $^{235}$U content and producing a first signal representative thereof, subtracting any 185.7-keV gamma ray background, monitoring the intensity of the 63-keV gamma ray doublet found in the nucleus of $^{234}$Pa, a granddaughter of $^{238}$U, and producing a second signal representative thereof, subtracting any 63-keV gamma ray background, and determining the ratio of the 185.7 and 63-keV gamma ray emission by comparing the first and second signals. The invention also provides a method for analyzing the thorium content of a liquid effluent sample where the sample is disposed in a sample counting chamber. The method comprises the steps of monitoring the intensity of the 238-keV gamma ray from the nucleus of $^{212}$Bi, in the decay chain of $^{232}$Th, and subtracting any 238-keV gamma ray background.

One object of the invention is to provide economical onsite monitoring capability.

Another object of the invention is to provide detectability as low as 10 nCi/g using a portable detector for transuranic solid bulk wastes.

Other objects and advantages of the instant invention will be apparent to those skilled in the art from the following description with reference to the appended drawings wherein like numbers denote like parts and wherein.

DETAILED DESCRIPTION OF THE PREFERRED EMBODIMENT OF THE INVENTION

Figure 1:
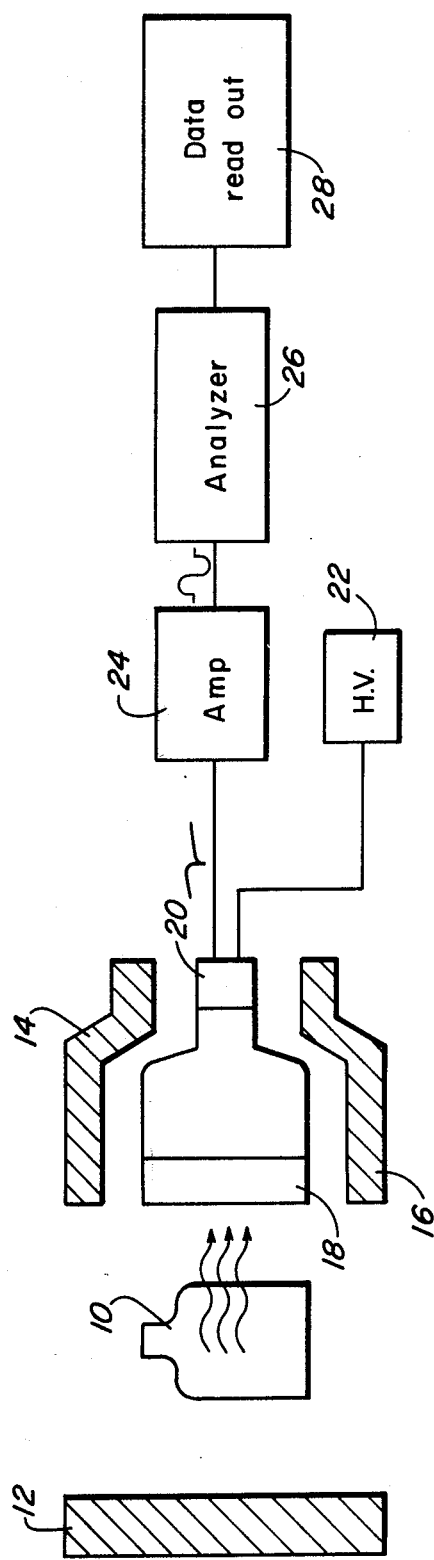
FIG. 1 is a schematic illustration of an exemplary detector for use in practicing the invention.

An exemplary detector for use in practicing the invention is disclosed in Nuclear Instruments and Methods 121 (1974) 491–498, entitled "Portable Radioactivity Monitor for Liquid Effluents, Surface Contaminations, and Bulk Solid Wastes" by C. J. Umbarger and L. R. Cowder, which is incorporated by reference. The device disclosed in the publication is a portable radioactivity monitor such as schematically illustrated in FIG. 1 herein. A sample is disposed within a container such as plastic bottle 10 having walls of uniform thickness. Bottle 10 is placed within a shielded support comprising shields 12, 14 and 16 contiguous to a sodium iodide (NaI) sensor 18. Shielding 12, 14 and 16 closely surrounding the container provides relatively error free (0.3% precision) readings. A signal produced by the NaI detector in response to radioactivity from the sample goes to a preamplifier 20 subject to a high voltage source 22. From the preamplifier the signal passes to an amplifier 24 and from there through a single or multichannel analyzer 26 to a scaler for data readout 28.

The liquid assay system illustrated in FIG. 1 is for analyzing batch liquid effluents samples contained in 250 ml plastic flasks. Effluent containing flasks are disposed in the counting chamber where steel springs (not shown) press the flask flush against the sodium iodide detector. In the preferred embodiment, the sodium iodide detector is 127 mm in diameter and has a 0.25 mm Be entrance window. However, for optimum signal-to-background ratios a predetermined detector thickness is selected for the specific isotopes to be monitored. It has been found that for general monitoring purposes, a 20 mm thick NaI detector is a good compromise between high detection efficiency and low backgrounds. This particular size NaI detector is optimum for monitoring gamma rays for uranium and thorium analysis and liquids in accordance with the present invention and will be discussed more in detail below. It will be appreciated that the thin Be window allows detection of low energy x-rays, i.e., on the order of 16-keV from plutonium and other heavy elements.

Analysis of radioactive materials is typically carried out by measuring the intensity of gamma rays emitted from the sample and known to be specific to a particular radioactive species. After correcting for matrix absorption, branching ratios, specific activity of the isotope, and detection efficiency, the amount of radioactive material in the sample can be determined. A sometimes easier approach, as utilized in practicing the invention, is to use standards that closely resemble the unknown sample in matrix and radioactive material content.

In accordance with the invention, liquid samples contained in the 250 ml plastic flasks 10 are placed in the liquid sample counting chamber defined within shielding 12, 14 and 16. The analysis for $^{235}$U proceeds by measuring the intensity of the 185.7-keV gamma ray emitted immediately following $^{235}$U alpha decay to $^{231}$Th. This gamma ray is very prolific, its emission rate being $\sim 4.3 \times 10^4$/g-sec, and being independent of the time since the uranium was chemically purified. A typical gamma ray spectrum appears in FIG. 2. This particular sample contained 0.25 g uranium of 2% enrichment. The various gamma ray regions are labeled.

Figure 2:
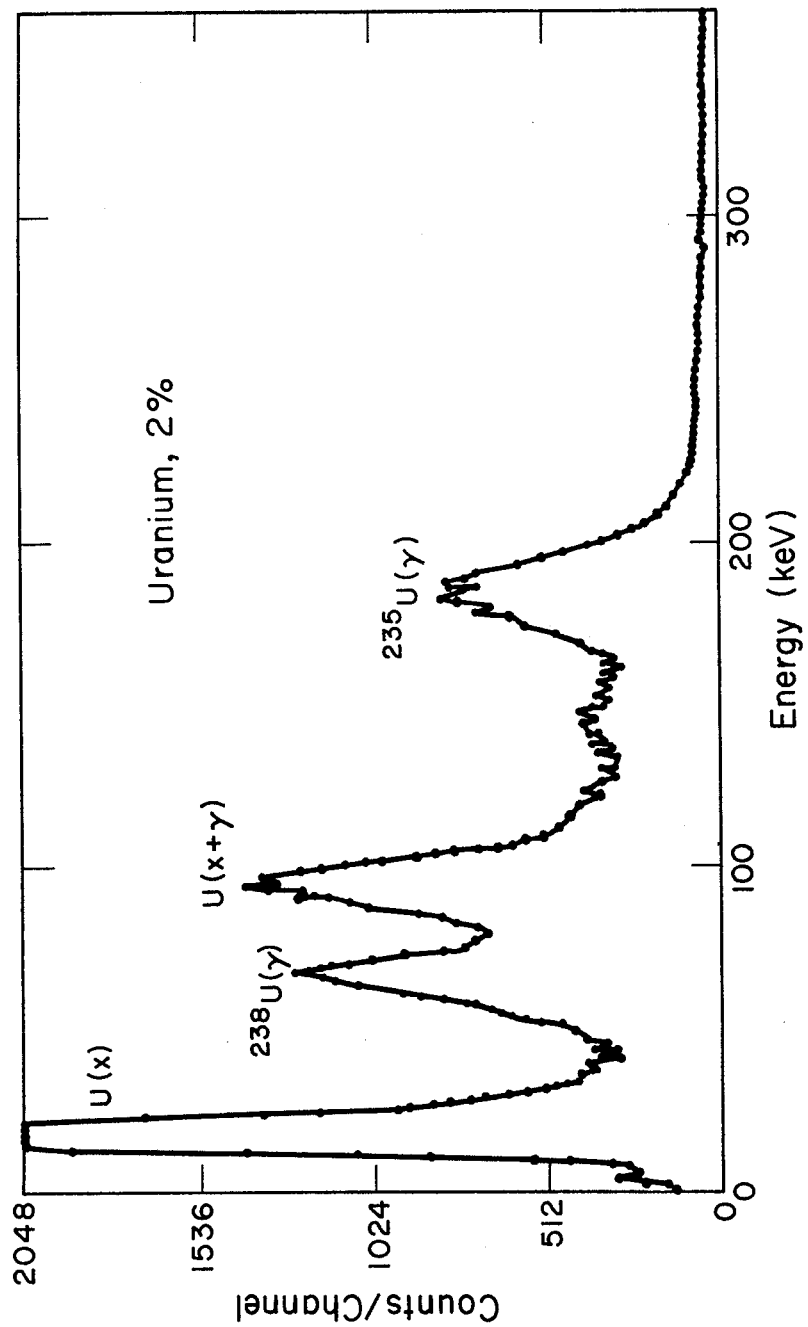
FIG. 2 shows a typical uranium spectrum measured in accordance with the invention using a multichannel analyzer.

Quantitative measurement for $^{238}$U in accordance with the invention proceeds by monitoring the intensity of the $\sim$ 63-keV gamma ray doublet found in the nucleus $^{234}$Pa, a granddaughter of $^{238}$U. After uranium chemical separation, this doublet exhibits a 24.1 day halflife for activity grow-in since it follows the beta decay of $^{234}$Th, the daughter of $^{238}$U. As shown in FIG. 2, this photon energy region is relatively clear and well resolved from the L and K x-ray regions of the uranium daughters. The intensity of the x-ray regions ($\sim$ 16-keV and $\sim$ 95-keV, respectively) not only exhibits time dependence as daughters grow-in, but these intensities are also composites of $^{235}$U and $^{234}$U activities (gamma and x-rays) beside $^{238}$U, complicating enormously the data analysis. This problem is magnified by the general lack of knowledge of the $^{235}$U/$^{234}$U ratio which varies between 100 and 200. For these reasons, the 63-keV region is chosen for $^{238}$U analysis. It is essentially a clean $^{238}$U signature, albeit time dependent.

Figure 3:
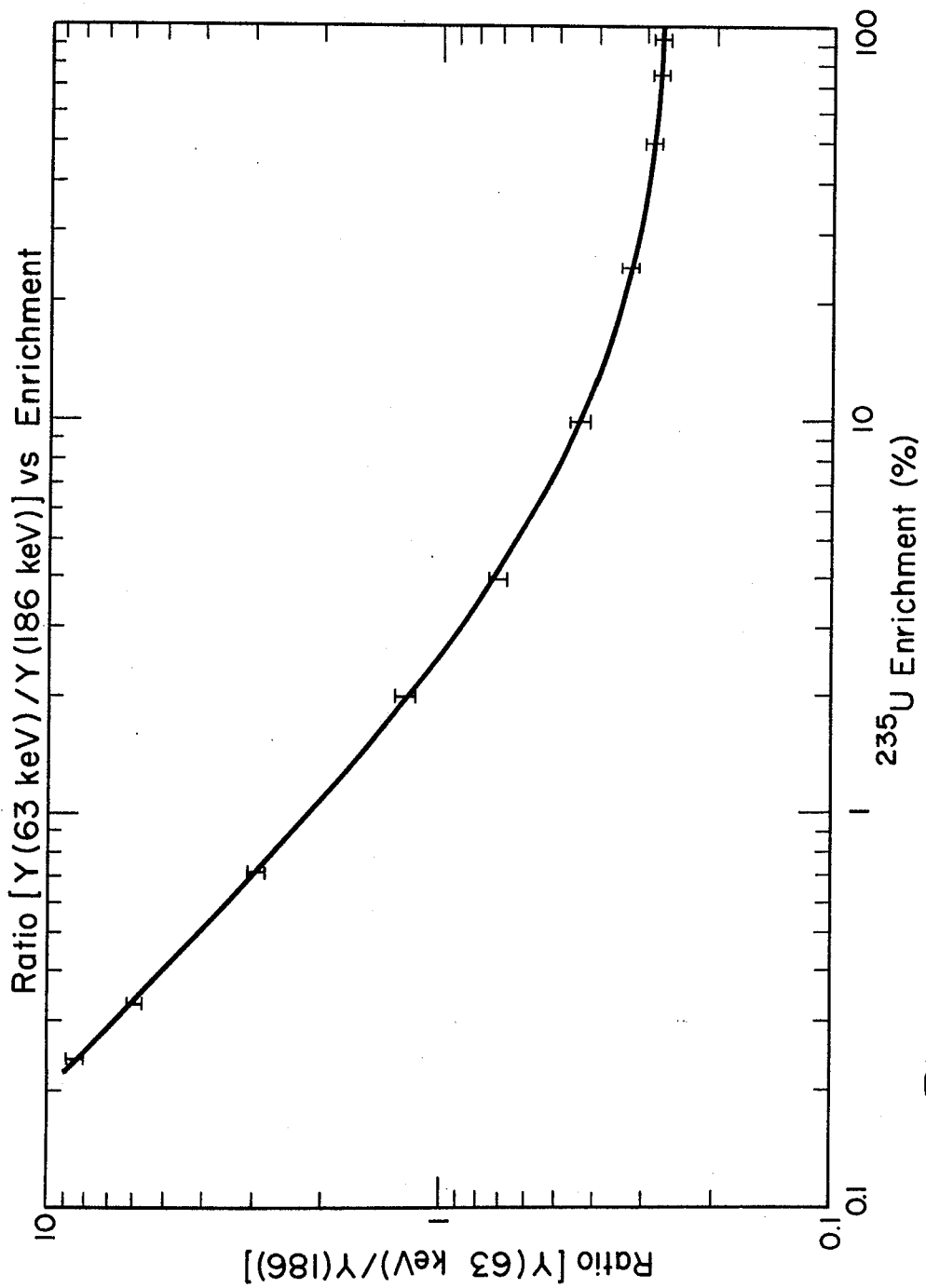
FIG. 3 illustrates the ratio of the 63-keV gamma ray intensity to 185.7-keV intensity versus $^{235}$U enrichment.
Figure 4:
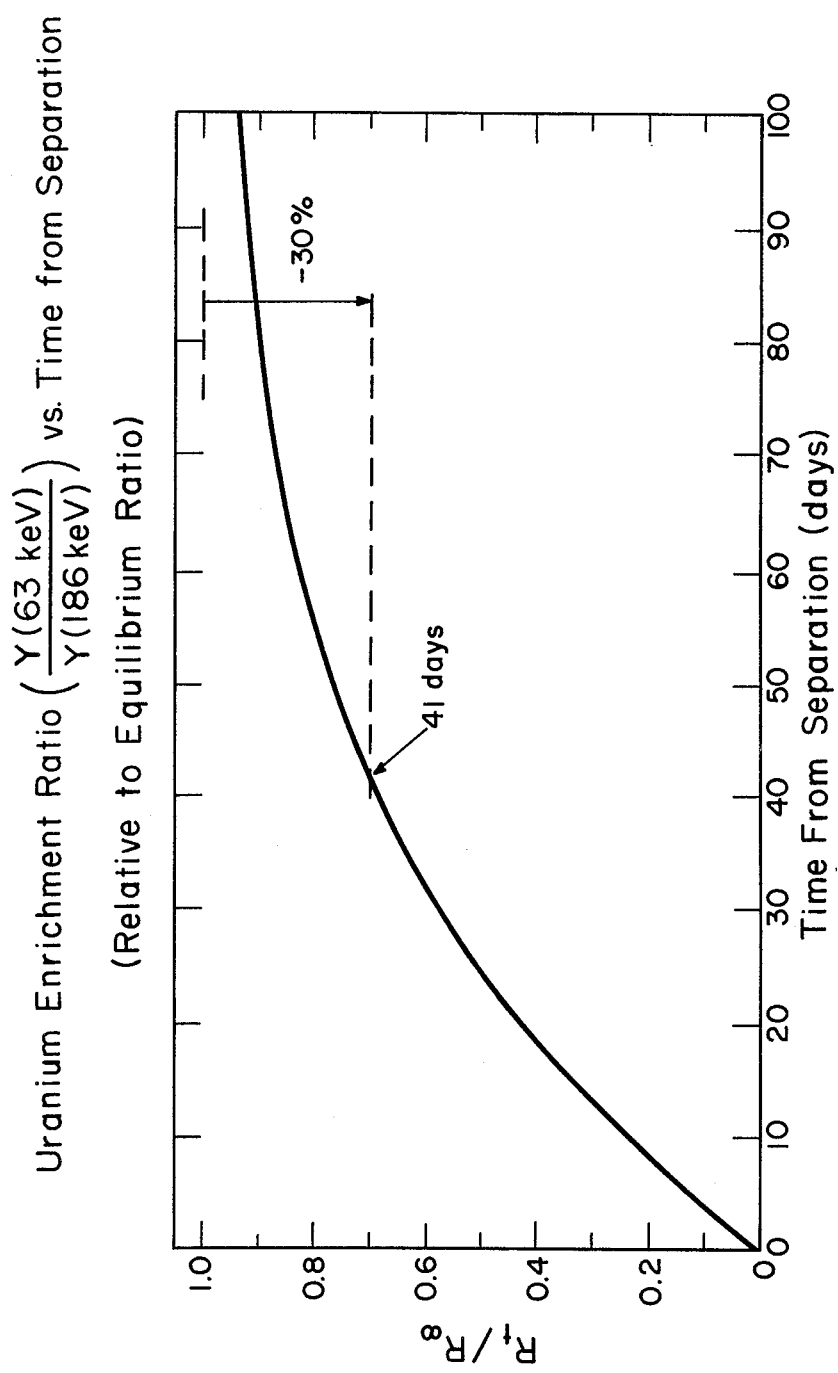
FIG. 4 is a graphical representation of calculated uranium enrichment ratio as a function of time from uranium chemical purification.

By measuring the ratio of the intensity of the signal in the 63-keV region to that in the 185-keV region, a signature of the uranium enrichment ($^{235}$U/ U + $^{238}$U) results. Because of the very low uranium concentrations in the sample, the usual "enrichment meter" principle of monitoring only the 185-keV gamma ray cannot be applied. An enrichment calibration curve obtained by using standard solutions of various enrichments spanning the enrichment region of interest is shown in FIG. 3. This enrichment signature has the time dependence of the 63-keV gamma ray, which is not as deleterious as first appears. FIG. 4 shows this signature as a function of time after chemical separation, relative to its equilibrium value. After a wait of only 41 days, the enrichment error is less than 30%. This error is a positive bias toward higher enrichments. In many instances the uranium solutions being analyzed may be known to have an age exceeding a given time period, hence allowing a maximum enrichment error to be assigned. In addition, a large enrichment error, e.g., ± 50%, is not unreasonable for low level, approximately Maximum Permissible Concentration ($\sim$ MPC), effluent streams.

Figure 5:
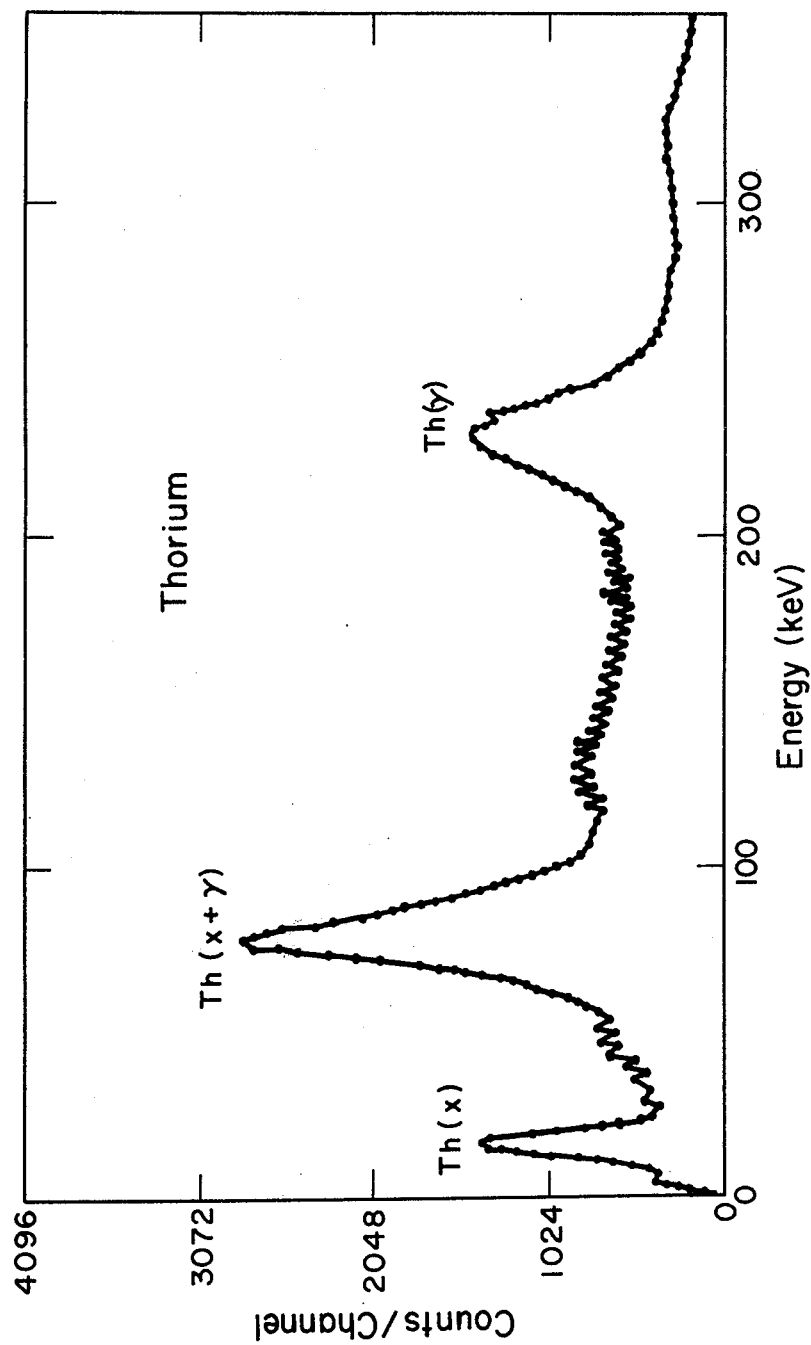
FIG. 5 shows a typical thorium spectrum as measured in accordance with the invention.
Figure 6:
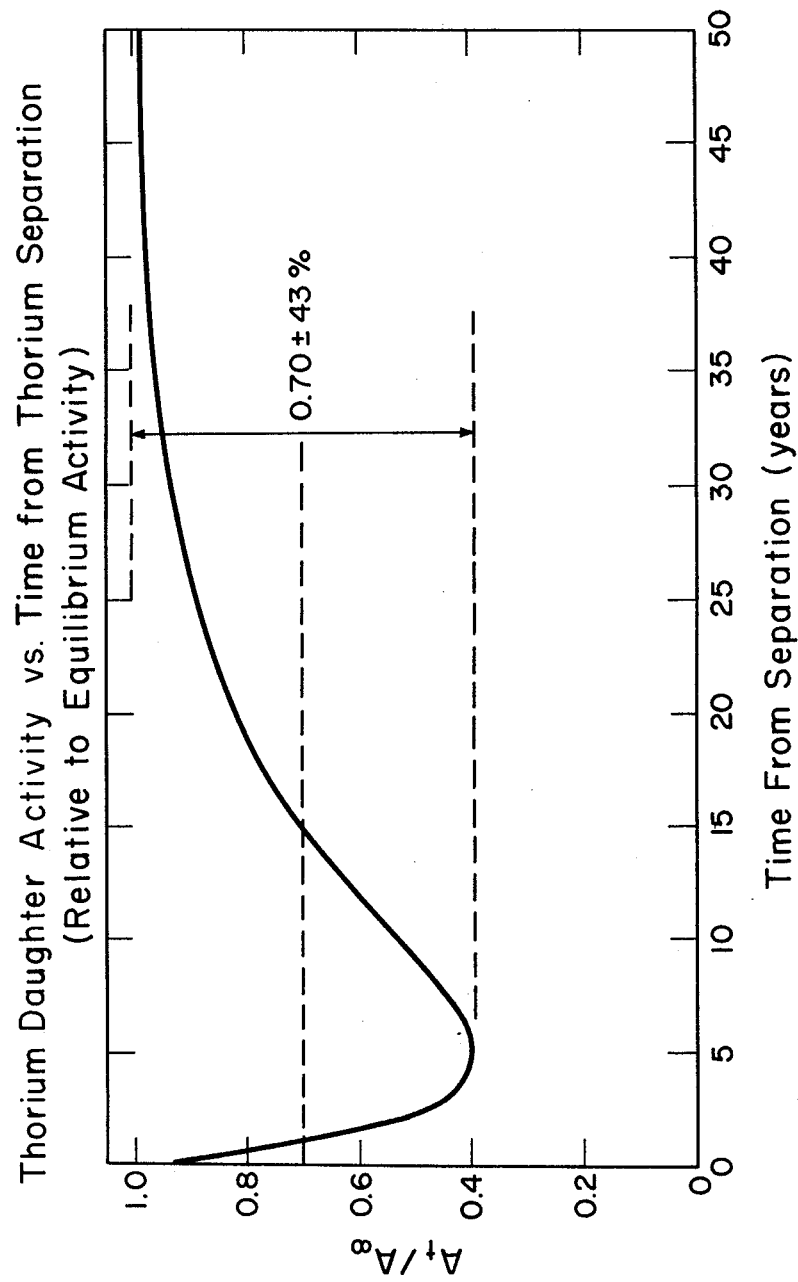
FIG. 6 illustrates calculated thorium daughter activity relative to its equilibrium activity, as a function of time from thorium chemical, but not isotopic separation.
Figure 7:
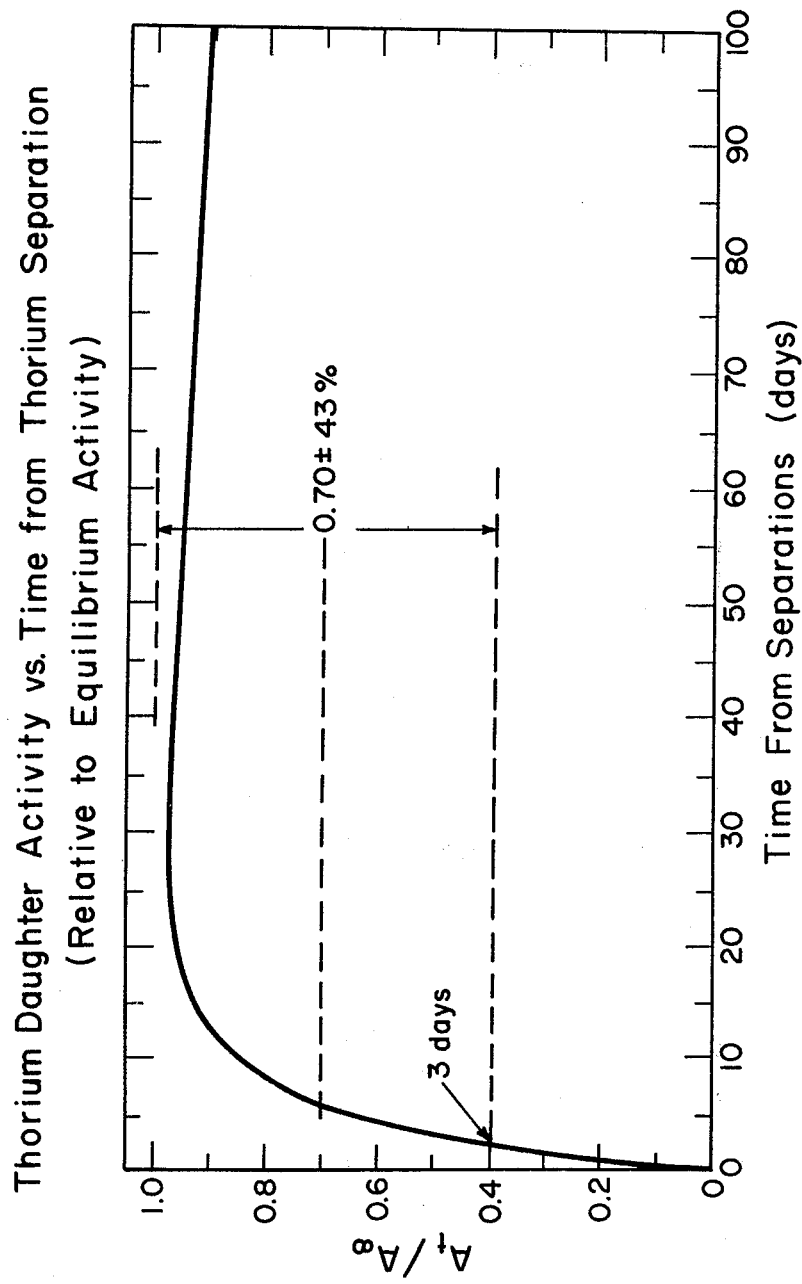
FIG. 7 is another graphical representation of calculated thorium daughter activity relative to its equilibrium activity, as a function of time from thorium chemical, but not isotopic, separation.

In accordance with the invention analysis for thorium proceeds by monitoring the intensity of the 238-keV gamma ray found deep in the decay chain of $^{232}$Th. FIG. 5 illustrates a typical thorium spectrum. This gamma ray actually appears in the nucleus $^{212}$Bi, a direct daughter of $^{212}$Pb. Although this gamma ray intensity depends on the time since thorium chemical separation, one may still obtain a reasonable estimate of the thorium content regardless of age, if a 43% error is acceptable. FIGS. 6 and 7 show the intensity of this gamma ray as a function of time since thorium separation relative to its equilibrium intensity. The calculations assume only a chemical separation of thorium, not isotopic; i.e., at time $(t) = 0$ both $^{232}$Th and $^{228}$Th are present. If the thorium calibration curve is based on 70% of the equilibrium activity of the 238-keV gamma ray, then the maximum assay error is ± 43% after a 3-day wait since separation (see FIGS. 5 and 6). Of course, if the age of the solution is known, a more accurate assay is possible.

As shown in FIG. 3, the uranium enrichment calibration curve levels off to a constant intensity ratio of $\sim$ 0.27 at a high uranium enrichment value (E $\gtrsim$ 75%). This is caused by interference from a 53-keV gamma ray from $^{234}$U, which tracks the $^{235}$U content. Due to the imperfect resolution of the NaI detector a certain fraction of the 53-keV gamma ray yield is counted in the 63-keV $^{238}$U window. A Ge(Li) detector would eliminate this interference, but would also add complexity and cost, to the overall system. How quickly this enrichment calibration curve levels off at high enrichments depends on the energy resolution of the particular NaI detector used and the width of the integration window selected for the 63-keV region, assuming gamma ray spectrum peak striping capability is not available. The decision on window width for the 63-keV region is based on the maximum enrichment one needs to measure, and the counting times available for adequate statistics. The window width chosen for the present data are 47 to 77-keV, 163 to 208-keV and 219 to 258-keV for the 63-keV, 185-keV, and 238-keV regions, respectively. Due to the uncertainty in the $^{234}$U/$^{235}$U ratio, the interference of the 53-keV gamma ray with the 63-keV integration region introduces a $\sim$ ± 3% error in the enrichment measurement.

In a typical assay, signal backgrounds are subtracted in two steps. First a clean water sample is assayed to obtain general room backgrounds in the three regions of interest, as well as a fourth region used for "real time" background analysis. This last region, which lies above the 238-keV area and stretches from 264 to 312-keV, is used to correct for background in the 185 and 238-keV regions due to Th and U contributions, respectively. The correction factor for this "real time" background subtraction is obtained by measuring pure uranium and thorium solutions. Accordingly, the weighing factors required to obtain backgrounds for the 185 and 238-keV regions are determined to be 1.87 and 1.21 times the signal (room background subtracted) in the fourth integration region (264-312-keV), respectively. Such a prescription for background subtraction is necessary to produce linear $^{235}$U and thorium responses over a wide range of uranium enrichment and uranium/thorium values.

In order to assay for uranium enrichment when thorium is present, a final background correction is necessary from thorium in the 50–100 keV region, as shown in FIG. 5. The thorium signal in this region essentially is due to K x-rays and gamma rays from daughter products of thorium. One first assays for thorium in the sample and then removes the appropriate background in the 63-keV $^{238}$U region. For the samples assayed here, one should remove 1.15 times the signal of the 238-keV region from the 63-keV region. The yield remaining is essentially a pure $^{238}$U signal. Because of the thorium interferences with the $^{238}$U signal, a thorium/uranium ratio of $\leq$ 4/1 is necessary for accurate enrichment measurements. Where the uranium enrichment is known, this ratio can probably go as high as 10/1 with good assay results for $^{235}$U alone and thorium.

Typical electronics needed for data acquisition comprise a 1 kilovolt high voltage DC power supply 22 and a multichannel analyzer (MCA) 26 with built-in amplifiers. A MCA with "intensified region" capability and a region integration feature is ideal. The four regions of interest discussed above can be programmed into the MCA with the aid of three standard calibration samples; one uranium of known enrichment and content, one thorium, and one pure water for room background subtraction purposes. Portable battery intrumentation can also be used, but with concomitant losses in electronic stability, flexibility, and ease of calibration and operation.

The counting efficiency for 63-, 185-, and 238-keV gamma rays emitted from the sample flask is constant at $\sim$ 26% over the concentration range of 0 to 1 g uranium (or thorium) per liter. Above 1 g/l this efficiency begins to drop off due to self absorption in the sample as verified both experimentally and by calculation. The concentration range can be extended upward by changing to thinner sample flasks. Approximate signal counting rates for $^{235}$U (185 keV), $^{238}$U (63-keV, at equilibrium), and thorium (238-keV, at equilibrium) are 1.1 × 10$^4$/sec-g, $\sim$ 2.1 × 10$^2$/sec-g, and 2.5 × 10$^2$/sec-g, respectively. Detectability limits for uranium and thorium are shown in Table I.

TABLE I

Detectability Limits For Uranium and Thorium in Water

| Isotope | MPC[a] µCi/cc | µg/cc | Detectability[b] µg/cc | MPC |
|---|---|---|---|---|
| 235$_U$ | 3 × 10$^{-5}$ | 14 | .08 | 0.006 |
| 238$_U$ | 4 × 10$^{-5}$ | 120 | 3 | 0.03 |
| Th (Nat) | 2 × 10$^{-6}$ | ~18 | 3 | ~0.17 |

[a] Public Water Systems
[b] 1000 sec count, 3σ level above background

These limits are based on a signal equal to 3 standard deviations (3σ) of the room background for a 1000-sec counting period. The system has demonstrated detectabilities far below MPC levels for $^{235}$U and $^{238}$U, and at the 0.17 MPC level for thorium. At lower elevations than where these measurements were performed (2225 meters), the detectabilities should improve considerably due to reduced cosmic ray backgrounds. The detectability limit for thorium in terms of MPC units can vary because of uncertainties in the specific activity of natural thorium samples caused by possible escape of daughters from the material. This points up one area of concern for thorium assay with this system since the thorium analysis is based on the measurement of a daughter activity with the assumption that no daughters have escaped (natural separation) since the original chemical (artificial) separation. If daughter escape occurs, the assay results will be lower than the actual thorium content.

An additional concern with thorium assay is that the sample may contain recycled uranium fuel with significant amounts of $^{232}$U. This isotope of uranium decays to $^{228}$Th and hence enters the normal thorium decay chain. When $^{232}$U is present, it will result in an erroneous thorium assay. If the recycled uranium contains $^{237}$U, it too will have a deleterious effect on the uranium-thorium measurement due to interference from its 208-keV gamma ray. However, if the material can be stored for a month or more, this isotope may be reduced to an acceptable level because of its short, 6.7-day halflife.

The uranium assay procedure above assumes the uranium has been chemically separated from its daughter products at some recent time such as during fuel enrichment and production. The assay of natural uranium ores, either dry or dissolved in water, can be complicated by the presence of varying amounts of daughter products that interfere with the $^{235}$U analysis. For example, the decay of $^{226}$Ra to $^{222}$Rn (both distant granddaughters of $^{238}$U) yields a 185.7-keV gamma ray. In natural uranium ore in equilibrium, over half of any $\sim$ 186-keV gamma radiation is due to this $^{238}$U granddaughter. The remainder of the gamma strength in this region belongs to $^{235}$U.

If other radioactive materials are present, such as fission products, etc., the detectability for uranium and thorium will be degraded due to increased backgrounds. If a MCA is used for data acquisition, any significant amount of such materials will be evident, with that particular sample being tagged for more extensive analysis.

The aforementioned concerns about interference from other radioactive materials point up the one major limitation of this assay system. As with any NaI based instrument, "black box" measurements can yield erroneous results. In such cases the use of a Ge(Li) detector may determine possible interferences. However, in the vast majority of assays performed in fuel process and fabrication facilities, samples are generally well characterized, with possible contaminants known in advance from a working knowledge of a particular facility's feed and product materials.

Assay accuracy of ± 10% is routinely possible for $^{235}$U, $^{238}$U enrichment and thorium content if daughter equilibrium can be assured for $^{238}$U and thorium. Otherwise, the errors stated above are appropriate. This ± 10% error applies to uranium enrichment of $\sim$ 10% or less. Above $\sim$ 10% enrichment, the leveling off of the calibration curve (FIG. 3) effects larger errors. As above discussed, a narrower integration window for the 63-keV gamma ray region will increase the accuracy of the enrichment measurement above 10% enrichments, but at a sacrifice in counting times. Also, for accurate enrichment measurements, the thorium/uranium ratio should be $\leq$ 4 to reduce thorium-related backgrounds in the $^{238}$U, 63-keV assay region. This large thorium-related background produces large errors for enrichment measurements, as shown in Table II for typical assay results for mixed uranium-thorium solutions. As also shown in Table II, good enrichment assay results are possible for thorium/uranium ratios $\leq$ 4. For reasonable thorium/uranium ratios ( $\leq$ 10/1), the accuracy of the $^{235}$U and thorium assays seem unaffected by the presence of each other and have errors of $\leq$ 10%.

TABLE II

| | Typical Assay Results For Mixed Uranium-Thorium Solutions | | | | | | | | | |
|---|---|---|---|---|---|---|---|---|---|---|
| | Thorium | | | Uranium-235 | | | Enrichment-$^{235}$U | | | |
| Sample | Mass (mg) | Assay (mg) | Δ (%) | Mass (mg) | Assay (mg) | Δ (%) | Real (%) | Assay (%) | Δ (%) | Th/U |
| 1 | 51.7  | 53.5  | 3.5 | 2.0  | 2.05  | 2.4 | 4.0  | 4.05 | 1.2 | 1.03 |
| 2 | 206.7 | 208.6 | 0.9 | 2.0  | 2.00  | 0.0 | 4.0  | 3.65 | 8.7 | 4.13 |
| 3 | 206.7 | 206.1 | 0.3 | 14.0 | 14.02 | 0.1 | 50.0 | 36.5 | 27  | 7.38 |

Because the L x-ray yields of the transuranic materials are the most prolific natural signature, except for weakly penetrating alpha particles, in practicing the invention one uses a method comprising high-energy gamma-ray and x-ray detection. This multi-energy gamma assay method allows one to monitor the x-ray region for the sub-10-nCi/g wastes, subsequently crossing over to progressively high energy gamma-rays as the activity level increases. Such a method novelly combines the high sensitivity and relatively poor accuracy of x-ray detection at the 10-nCi/g level with the lower sensitivity, but improved accuracy of gamma-ray detection at higher activity levels. The errors encountered are caused by absorption by the matrix material and self-shielding by the transuranics themselves. The self-shielding effects are severe for all photon energies considered here, particularly for the low-energy L x-rays. Part of the self-shielding problem can be alleviated by using proper standards, e.g., dried liquid plutonium standards for assaying process line-generated wastes from ion-exchange columns. For typical room-generated wastes which are reasonably free of contamination, essentially no self-absorption effects exist.

The 0.25 mm Be entrance window of the preferred embodiment is sufficiently thin to allow x-ray transmission into the crystal, whereas the detector itself is thick enough to appreciably absorb high-energy gamma-rays, e.g., 400-keV complex from $^{239}$Pu. For improved 400-keV gamma-ray detection efficiency, a 5.08 cm thick NaI(Tl) detector can be utilized.

As noted above, the detectability of the system of the invention is lower than 10-nCi/g for bulk packages (e.g., 0.06 m$^3$) of low density (combustibles, paper, cloth, plastic, etc.) wastes. For each package containing approximately 4000 g of wastes, detectability limits (3σ above background) of 0.04 nCi/g are possible in a 1000-sec count monitoring the 16-keV L x-ray region. This is equivalent to ∼ 2 μg (94% $^{239}$Pu, 6% $^{240}$Pu) in 4000 g of waste. By monitoring the higher energy photon regions of plutonium (120-keV, 200-keV, and 400-keV), detectability limits of 3.0 nCi/g, 27 nCi/g, and 36 nCi/g are achieved in 1000 seconds, respectively. The detectability limit for $^{241}$Am (monitoring its 60-keV gamma ray) is approximately 15 times lower (better) than that of plutonium using the L x-ray region (16-keV). This is due to the higher photon yield per disintegration for $^{241}$Am compared to $^{239}$Pu and to the increased penetrability of the $^{241}$Am 60-keV gamma ray compared to 16-keV x-rays. Plutonium assay errors are typically ± 50% using x-rays and 30% for gamma ray measurements. Smaller packages than the 0.06 m$^3$ container would afford smaller errors. These errors statements assume that adequate reference standards can be prepared; otherwise the errors could be considerably larger.

The various features and advantages of the invention are thought to be clear from the foregoing description. However, various other features and advantages not specifically enumerated will undoubtedly occur to those versed in the art, as likewise will many variations and modifications of the preferred embodiment illustrated, all of which may be achieved without departing from the spirit and scope of the invention as defined in the following claims.

What we claim is:

1. A method for analyzing the uranium content of a liquid effluent sample where the sample is disposed in a sample counting chamber, the method comprising the steps of:

monitoring the intensity of gamma rays over a first energy region including the 185.7-keV gamma ray emitted immediately following $^{235}$U alpha decay to $^{231}$Th to obtain $^{235}$U content;

measuring the gamma intensity within the first region without samples to obtain background count;

subtracting any room background 185.7-keV gamma ray;

producing a first signal representative thereof;

monitoring the intensity of gamma rays over a second energy region including the ≈ 63-keV gamma ray doublet found in the nucleus of $^{234}$Pa a granddaughter of $^{238}$U;

measuring the gamma intensity within the second region without samples to obtain background count;

subtracting any room background 63-keV gamma ray and producing a second signal representative thereof; and determining the ratio of the 63-keV and 185.7-keV gamma ray emission by comparing the first and second signals to provide a signal representative of the uranium enrichment of said sample.

2. A method of assaying for uranium in a sample when thorium is present comprising the steps of:

assaying the sample for thorium by monitoring the intensity of gamma rays over a first energy region including the 238-keV gamma ray from the nucleus of $^{212}$Bi, in the decay chain of $^{232}$Th;

measuring the gamma intensity within the first region without samples to obtain background count;

subtracting any room background 238-keV gamma ray;

monitoring the intensity of gamma rays over a second energy region including the 185.7-keV gamma ray emitted immediately following $^{235}$U alpha decay to $^{231}$Th to obtain $^{235}$U content;

measuring the gamma intensity within the second region without samples to obtain background count;

subtracting any room background 185.7-keV gamma ray producing a first signal representative thereof;

monitoring the intensity of gamma rays over a third energy region including the ≈ 63-keV gamma ray doublet found in the nucleus of $^{234}$Pa, a granddaughter of $^{238}$U;

measuring the gamma intensity within the third region without samples to obtain background count;

subtracting any room background 63-keV gamma ray background;

producing a second signal representative thereof;

determining the ratio of the 185.7 and 63-keV gamma ray emission by comparing the first and second signals.

3. A method for analyzing the transuranic content of solid wastes where the sample is disposed in a sample counting chamber responsive to L x-rays and to multi-energy gamma rays, comprising the steps of:

monitoring energy levels in the L x-ray region for 1000 seconds;

monitoring energy levels in the gamma-ray region up to and including the 400-keV region for 1000 seconds; and comparing the resulting energy spectrum with the energy spectrum of reference standards.

* * * * *